United States Patent [19]

Horst

[11] Patent Number: 5,461,295
[45] Date of Patent: Oct. 24, 1995

[54] NOISE REDUCTION IN A SWITCHED RELUCTANCE MOTOR BY CURRENT PROFILE MANIPULATION

[75] Inventor: Gary E. Horst, Manchester, Mo.

[73] Assignee: Emerson Electric Co., St. Louis, Mo.

[21] Appl. No.: 187,532

[22] Filed: Jan. 28, 1994

[51] Int. Cl.$^6$ ........................................................ H02P 7/36
[52] U.S. Cl. ............................ 318/701; 318/254; 318/685
[58] Field of Search ............................ 318/701, 696, 318/685, 254, 138, 439

[56] References Cited

U.S. PATENT DOCUMENTS

| | | | |
|---|---|---|---|
| 4,253,053 | 2/1981 | Day et al. ........................... | 312/701 |
| 4,661,756 | 4/1987 | Murphy et al. ..................... | 318/701 |
| 4,868,477 | 9/1989 | Anderson et al. .................. | 318/696 X |
| 4,933,621 | 6/1990 | MacMinn et al. .................. | 318/701 X |
| 4,961,038 | 10/1990 | MacMinn ........................... | 318/701 X |
| 5,072,166 | 12/1991 | Ehsani ............................... | 318/685 X |
| 5,196,775 | 3/1993 | Harris et al. ....................... | 318/638 |

OTHER PUBLICATIONS

S. Chan & H. R. Bolton, Performance enhancement of single-phase switched-reluctance motor by DC link voltage boosting, Sep. 1993.

*Primary Examiner*—David S. Martin
*Attorney, Agent, or Firm*—Polster, Lieder, Woodruff & Lucchesi

[57] ABSTRACT

Apparatus (10) for controlling the current profile (P2) in a single or polyphase SRM (M) during the active portion of a phase. Switches (S1, S2) are closed during an active portion of a phase to direct current flow into a winding (W). A Hall effect sensor (14) and other sensors are used to sense various operating parameters of the SRM. A PWM signal generator (16), or microprocessor (20) is responsive to the sensor inputs to provide PWM operating signals (G2) to at least one of the switches to control current flow to the winding. The operating signals modulate the switch(es) for switch operation to be controlled as a function of the signal characteristics of the operating signals. This allows the current supply to the winding to be in accordance with the current profile. According to the profile, current flow is initially rapidly increased from zero to a peak value ($I_p'$) when the phase becomes active. The current is then allowed to decrease from this peak to a second and lesser value ($I_p$) by the time the phase becomes inactive. Current decays from this second value to zero when the phase becomes inactive. The transition in the current profile which occurs when the phase switches from active to inactive is no longer an abrupt transition, but is rather a more moderate one. This smoother transition reduces the amount of ringing in the motor, which normally occurs when current flow into the winding ceases, thereby to reduce motor noise.

19 Claims, 3 Drawing Sheets

NOISE REDUCTION IN A SWITCHED RELUCTANCE MOTOR BY CURRENT PROFILE MANIPULATION

BACKGROUND OF THE INVENTION

This invention relates to switched reluctance (SRM) motors and, more particularly, to a method of reducing motor noise by controlling or manipulating a current profile for a motor.

Switched reluctance, or SRM motors are well-known in the art. One problem with operating these motors is noise. As discussed in my co-pending patent application Ser. No. 08/75,268, one source of this noise is caused by the dissipation Of current in a motor's phase windings as each phase is switched at the end of its cycle. As the motor is switched from one phase to another, the energy, which represents approximately thirty percent (30%) of the energy supplied to the phase winding during its active period, decays off. As described in the application, a portion of this energy is either recovered using a storage capacitor, or dissipated.

In general, it will be understood that a major cause of motor noise is an abrupt change in the normal forces to which the motor is subjected. The noise is particularly acute if any of these transitions occur when at the maximum deflection points in the a motor cycle. In my U.S. Pat. No. 5,239,217, I have described a phenomenon referred to as "ovalizing". This is a condition in which the general circular shaped rotor and stator of a motor tend to be distorted into an oval shape by the forces produced when rotor poles and stator poles come into alignment. These earlier applications further describe techniques by which these ovalizing forces can be minimized.

It will be understood that while the approaches set forth in my earlier applications are effective in reducing motor noise, other efforts to further reduce motor noise are also important. One of these is to control the current profile of each motor phase. One control scheme by which current is controlled to minimize torque, uses various look-up tables or schedules to effect control. (See U.S. Pat. No. 4,868,477 to Anderson et al.) It is also known to control a current profile by advancing the length of a phase thereby increasing motor dwell time for the phase. (See U.S. Pat. No. 4,253,053 to Ray et al.) A third scheme is discussed by S. Chan and H. R. Bolton in their paper Performance Enhancement of Single-phase Switched Reluctance Motor by DC Link Voltage Boosting; IEEE Proceedings-B, Volume 140, Paper No. 5, Sep. 1993. Here, current is put into a phase and subsequently taken out at a faster than normal rate by employing a boost voltage at the beginning and end of a phase. A drawback with this approach is its inflexibility.

While the above approaches may be effective, they require a significant amount of circuitry, or a significant amount of manipulation, to achieve a reasonable amount of control. Other ways of current profile control may be more effective and easier to achieve. It is important to understand that noise reduction is accomplished by matching as closely as possible the slope of the current profile at the end of the active portion of a phase with the slope of the tail current decay portion of the profile. I have disclosed apparatus and a method for controlling tail current decay in my co-pending application Ser. No. 08/175,268. In accordance with the disclosure therein, the slope of the decay portion of the profile is controllable. By using the circuitry and method as disclosed herein, the phase active portion of the profile is controllable so a smoother transition is now obtainable, without effecting the period of the phase or other significant motor operating parameters to effect significant noise reduction.

SUMMARY OF THE INVENTION

Among the several objects of the present invention may be noted the provision of a control scheme and method for manipulating the current profile in each phase of a single or polyphase SRM, for example, 2-phase and 3-phase SRM's such as a 12-6, 2-phase SRM and a 6-4, 3-phase SRM; the provision of such a control scheme and method which controls the current profile during the active portion of each phase so as to lessen motor noise; the provision of such a control scheme and method which uses either hard chopping and soft chopping current control techniques to control the current profile; the provision of such a control scheme and phase which drives the current level to a peak amplitude exceeding that to which the current is normally driven; the provision of such a control scheme and method which further allows the current to fall from its peak to a lower level, this occurring during the normal phase active portion of a phase thereby for the change in slope of the current profile which occurs when the phase becomes inactive to be much less abrupt than when it would otherwise be; the provision of such a control scheme and method which are readily incorporated into existing SRM control circuitry and which can include a microprocessor; the provision of such a control scheme and method which drives the current to the peak by initially significantly increasing voltage input to the phase winding; the provision of such a control scheme and method which controls the duty cycle of a PWM signal used to control current flow in a phase winding when the phase is active thereby to rapidly drive the current to its peak amplitude at the beginning of the phase's active period; the provision of such a control scheme and method which alternately controls the frequency of the PWM signals to achieve the same result; the provision of such a control scheme and method to vary both duty cycle and PWM frequency to accomplish the same result; The provision of such a control scheme and method to modify the normal forces within the motor so there is a less abrupt change in the normalized ovalizing forces acting on the motor when the motor phase changes from active to inactive thereby to reduce ringing in the motor; and, the provision of such a control circuit which is a low cost, reliable circuit which functions to reduce noise throughout the range of SRM operation.

In accordance with the invention, generally stated, apparatus is provided for controlling the current profile in a single or polyphase SRM during the active portion of a phase. Switches are closed to direct current flow into a winding when the phase is active. A Hall effect sensor and other type sensors are used to sense various operating parameters of the SRM. A PWM signal generator, or microprocessor having a PWM signal output, is responsive to the sensor inputs to provide PWM operating signals to at least one of the switches to control current flow to the winding. The operating signals modulate the switch whereby its operation is controlled as a function of the signal characteristics of the operating signals. This allows the current supply to the winding to be in accordance with a predetermined profile. According to the profile, current flow is initially rapidly increased from zero to a peak value when the phase becomes active. The current is then allowed to decrease from this peak to a second and lesser value by the time the phase becomes inactive. The current decays from this second value to zero when the phase becomes inactive. The transition in the current profile which occurs when the phase switches from active to inactive is no longer an abrupt transition, but is rather more moderate. This smoother transition reduces the amount of ringing in the motor, which normally occurs when current flow into the winding ceases, thereby to reduce motor noise. A method of controlling the current profile is also disclosed. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF PREFERRED EMBODIMENTS

Figure 1:
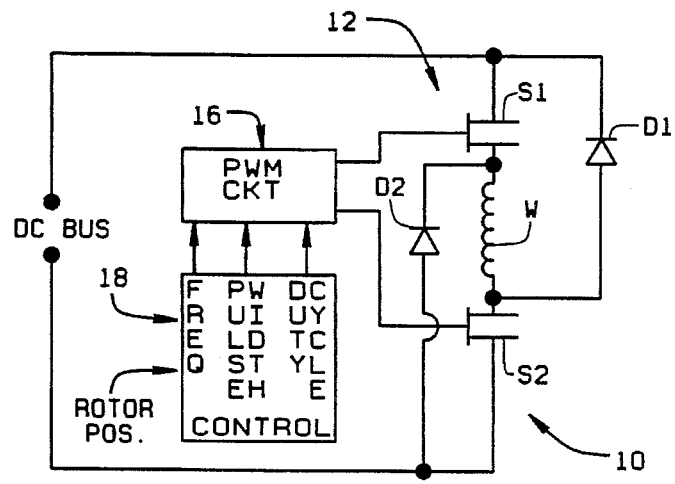
FIG. 1 is a schematic of a first circuit of the present invention for manipulating the current profile of the current supplied to an SRM winding during the active portion of the phase.

Referring to the drawings, a switched reluctance motor M (see FIGS. 6A and 6B) is a single phase switched reluctance motor; or, the motor can be a polyphase motor such as a 2-phase, 3-phase, or 4-phase motor which is typically a multiple pole motor. Examples of such motors are a 12-6, 2-phase motor, or a 6-4, 3-phase motor. The motor has a stator assembly S including a plurality of stator teeth ST only one of which is shown in the drawings. The motor further includes a rotor assembly R which is mounted on a shaft H and disposed for rotation relative to the stator assembly. The rotor assembly includes a plurality of rotor teeth RT. As the rotor rotates in the clockwise direction indicated in the drawings, forces are created in both the stator and rotor assemblies. These forces reach a peak when a rotor tooth is directly opposite a stator tooth, as indicated by the magnitude of the arrows in the respective FIGS. 6A and 6B. These forces create an ovalizing effect on the motor.

During operation of the motor, each respective motor phase is energized and de-energized in a sequential manner. The length of time each phase is active is based on various operating parameters and various control schemes have been implemented to determine when switching should occur from one phase to the next. When the phase becomes active, current is supplied to a phase winding W of the motor. Current is continuously supplied to the winding during the interval the phase is active. As shown in FIG. 4B, current supply to the winding commences at a time $T_o$.

An apparatus 10 of the present invention is used to control the current profile P (see FIG. 4D) in a single or polyphase switched reluctance motor M during an active portion of each phase. As shown in FIG. 1, phase winding W is connected to a DC bus via a switch means 12. The switch means directs current flow into the winding when the phase is active and includes a first switch S1 for connecting the winding to one side of the bus and a second switch S2 for connecting the winding to the other side of the bus. The switch means also includes respective diodes D1, D2. When the phase represented by the winding is active, switches S1, S2 are closed.

Figure 6A:
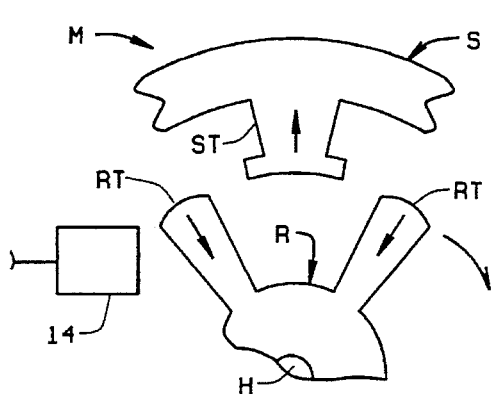
FIGS. 6A and 6B illustrate the forces created in a motor during passage of a rotor pole of the motor past a stator pole; and, FIGS. 7A–7C respective various PWM signal characteristics when are obtainable with the circuits of the present invention to obtain the current profile of FIG. 4D.
Figure 6B:
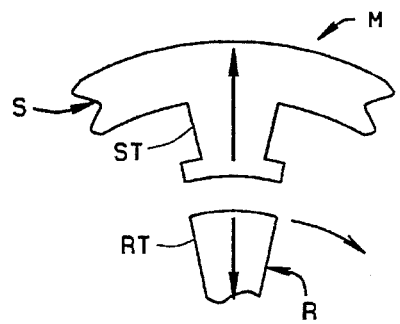

Various sensing means are provided for determining motor operating parameters. In FIG. 6A, for example, a Hall effect sensor 14 is provided for determining the instantaneous position of rotor assembly R. Other sensors, while not shown, are used to provide motor speed, torque, and similar parametric information. Next, a signal generating means indicated generally 16 in FIG. 1 includes a PWM signal generator which provides operating signals to one or both of the switches S1, S2, for reasons described hereinafter, to control current flow to winding W. A control means indicated generally 18 in FIG. 1 is responsive to inputs from the sensing means to control operation of the signal generating means. The control means controls operation of the signal generating means so the signal generating means provides operating signals having operating characteristics by which the current supply to the winding is in accordance with a predetermined profile.

Figure 4A:
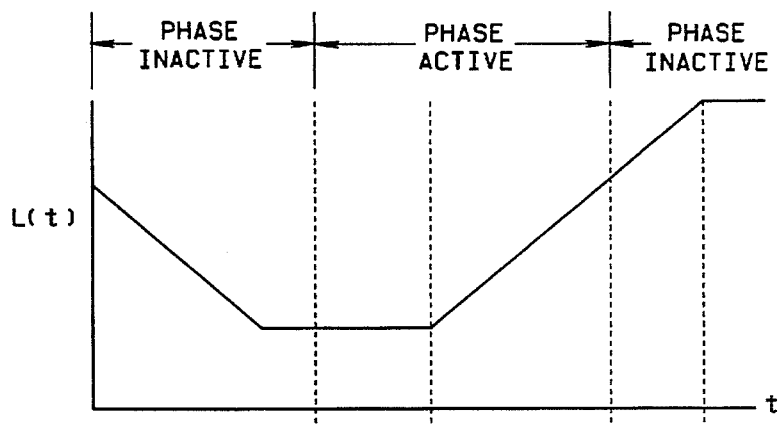
FIG. 4A is a graph of the winding inductance of a motor phase during active and inactive portions of the motor phase.
Figure 4B:
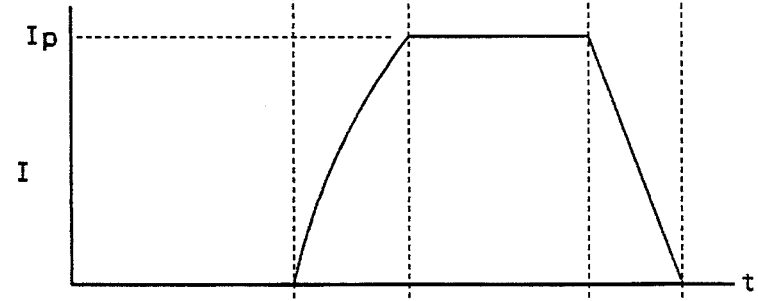
FIG. 4B represents a typical current profile during the active portion of a phase and the PWM signal characteristics of the control signal used to produce the profile.
Figure 5A:
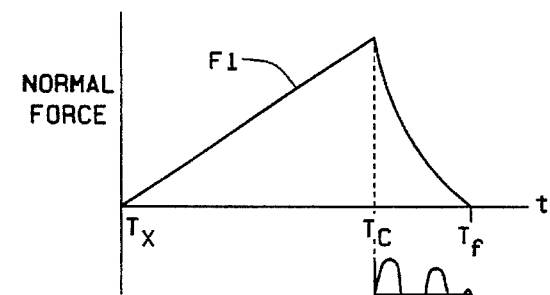
FIG. 5A graphically depicts the normal motor force during a phase active portion of a phase and the resultant ringing produced when the phase becomes inactive, the current profile for the motor corresponding to that of FIG. 4B.

Referring to FIGS. 4A, 4B, and 5A, a typical current profile P1 for a motor phase, and the resulting normalized force in the motor are shown. In FIG. 4B, the current level is shown to be zero amps prior to the particular phase with which the winding is associated becoming active. The phase becomes active at time $T_0$. Thereafter, until a time $T_c$, current is supplied to the phase winding. At time $T_c$, the phase becomes inactive and current flow into the winding ceases. From time $T_c$ until a time $T_f$, the current decays back to zero. When current begins flowing into the phase winding, the current level typically rises to a level $I_p$, this level being reached at a time $T_x$. From the time $T_x$ until the time $T_c$, the current flow into the winding is constant and is maintained at the level $I_p$. When current flow into the winding ceases at time $T_c$, there is an abrupt transition in the slope of the current profile. This is because the current in the winding at time $T_c$ is rapidly driven to zero as indicated by the sharp slope in the current profile. The inductance profile L for winding W is represented in FIG. 4A, and represents the inductance in the winding with current supplied to the phase in accordance with the profile of FIG. 4B. As shown in FIG. 5A, the normalized force profile F1 for the motor also shows an abrupt transition at the current cut-off time $T_c$. The result of this sharp change in slope of the normalized force profile is a loud ringing which is represented by the waveform V1 in FIG. 5A. This ringing, in turn, produces a high noise level in motor. This noise level is undesirable.

Figure 4C:
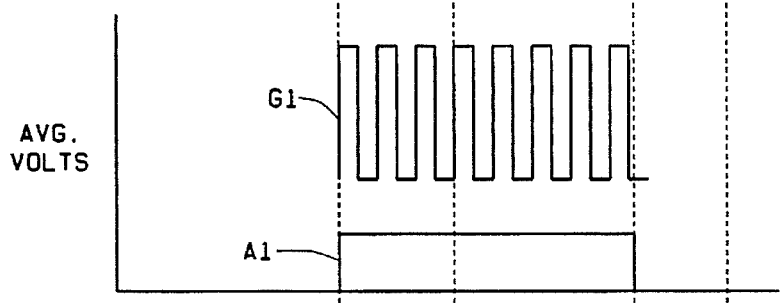
FIG. 4C represents the average voltage of the PWM signal of FIG. 4B.
Figure 4D:
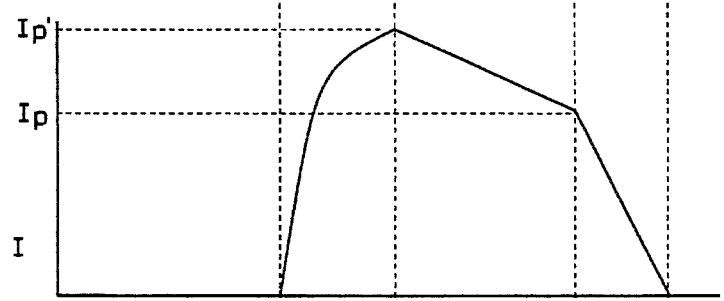
FIG. 4D represents a current profile produced by the circuits of the present invention and one type PWM signal used to produce the profile.
Figure 5B:
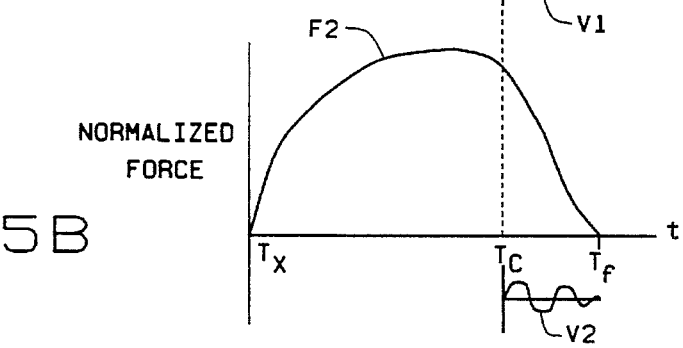
FIG. 5B graphically depicts the normal motor force during a phase active portion of a phase and the resultant ringing produced when the phase becomes inactive, the current profile for the motor corresponding to that of FIG. 4D.

It is a feature of circuit 10, and the method of the present invention, to produce a current profile such as the profile P2 shown in FIG. 4D. In accordance with the method, current flow into the winding rapidly increases from zero to a peak value $I_p'$ when the phase becomes active. As shown in FIG. 4D, the current is driven to this peak value in the interval between $T_o$ and $T_x$. From time $T_x$, the current is then allowed to decrease from this peak value to a second and lesser value, for example, the current level $I_p$, by the time the phase becomes inactive at time $T_c$. The current then decays from this second value to zero when the phase becomes inactive. The advantage of controlling the current profile in this manner is that the slope of the current profile between time $T_x$ and time $T_c$ is no longer substantially flat as occurs in the typical situation of FIG. 4B. Rather, the current profile has a slope (a negative slope) which is similar to that of the slope from time $T_x$ to time $T_p$, although the slope is not as abrupt. Now, when current supply to the phase is stopped at time $T_c$, the transition in the current profile which occurs is not an abrupt transition, but a much gentler, or smoother transition. In FIG. 5B, which shows the normalized force profile F2 for the motor when current is supplied to a phase in accordance with the profile P2, this smoother transition reduces the amount of ringing in the motor which now occurs when current flow into the winding ceases. This is shown by the waveform V2 in FIG. 5B. As shown, the result is a significant reduction in motor noise.

Figure 2:
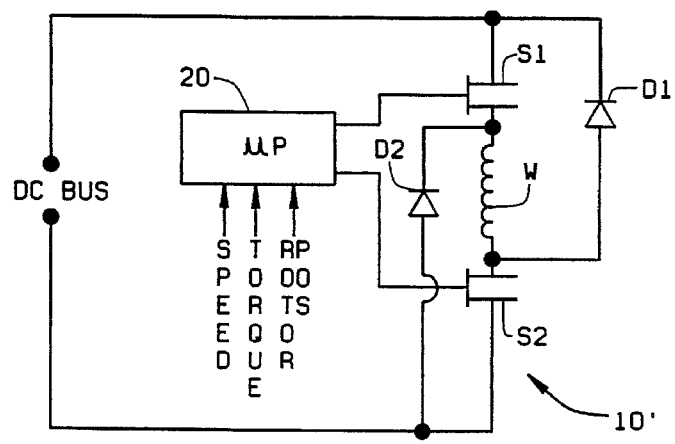
FIG. 2 is a schematic of a second circuit of the invention for manipulating the current profile.
Figure 3A:
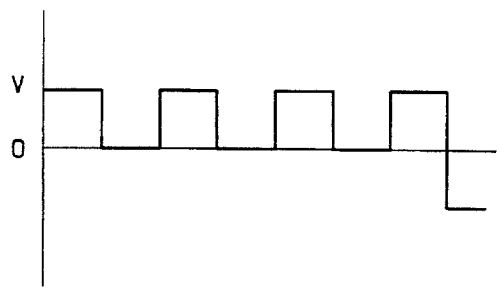
FIGS. 3A and 3B respectively represent soft chopping and hard chopping PWM waveforms for controlling current supply to a winding.
Figure 3B:
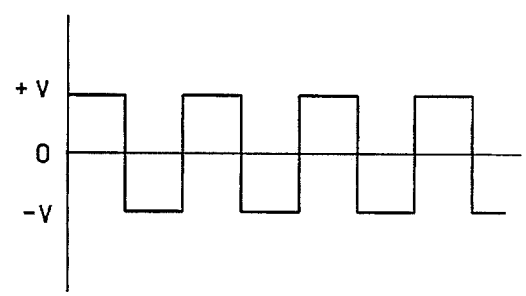

As noted above, circuit 10 of the present invention, includes a PWM signal generator 16 which supplies operating signals to one or both of the switches S1, S2. Alternatively, and as shown in FIG. 2, a circuit 10' utilizes a microprocessor which has a PWM signal output to also supply operating signals to the switches. Either signal generator 16 or microprocessor 20 is capable of supplying a PWM signal which is a "soft" chopping signal, or a "hard" chopping signal. A soft chopping PWM signal is shown in FIG. 3A, a hard chopping signal in FIG. 3B. If the signal generator or microprocessor supplies a soft chopping signal, this signal is only supplied to one of the switches: for example, switch S2, to modulate the switch between its "on" and "off" positions. The other switch S1 is maintained in a constant "on" state during the active portion of the phase. On the other hand, if the signal generator or microprocessor supplies a hard chopping signal, it is supplied simultaneously to both switches.

Figure 4E:
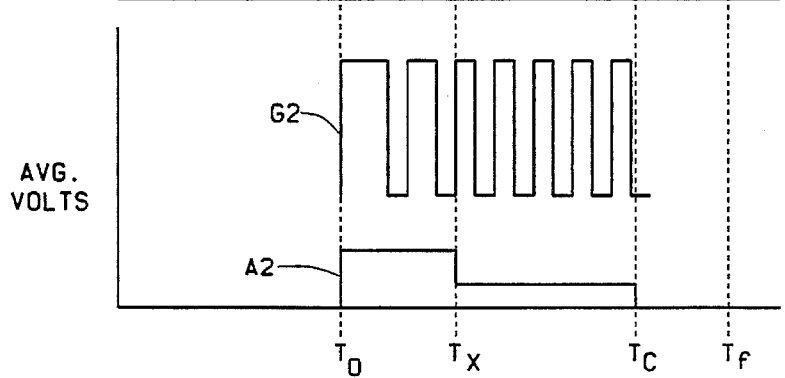
FIG. 4E represents the average current of the PWM signal of FIG. 4D.

Referring to FIG. 4C, a PWM signal G1 is shown by which the current is supplied to a phase winding in accordance with the current profile P1. Signal G1 has a constant frequency and constant duty cycle throughout the phase active interval extending from time $T_o$ to time $T_c$. An average voltage curve A1 represents the average voltage of the PWM waveform supplied to the phase during its active interval and is shown to be a constant value throughout. To achieve the current profile P2 in accordance with the teachings of the present invention, the PWM signal or signals G2 (see FIG. 4E) supplied to the winding can be controlled in a number of different ways. In FIG. 4E, the operating signals are shown to have a constant frequency, but variable duty cycle. Thus, as seen in FIG. 4E, from time $T_o$ to time $T_x$, the operating signals have a duty cycle which start at a first value and then become progressively shorter throughout this interval. From time $T_x$ to time $T_o$, the operating signals have a constant duty cycle. However, this duty cycle is shorter than the duty cycle of any of the operating signals supplied the switch or switches from time $T_o$ to time $T_x$. Now, the average voltage curve of the PWM signals supplied to the phase during its active portion is shown to have a first segment where the average voltage is substantially greater than that of a second segment. The length of the respective segments correspond to the respective intervals of variable and fixed duty cycle PWM signal supply to the phase. This is significant because it means that to drive the current to the desired peak level $I_p'$ by time $T_x$, the average voltage input to the phase must be significantly higher than that which is otherwise supplied.

Figure 7A:
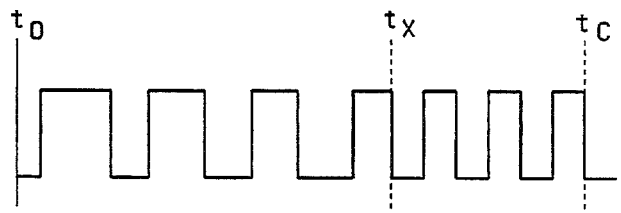
Figure 7B:
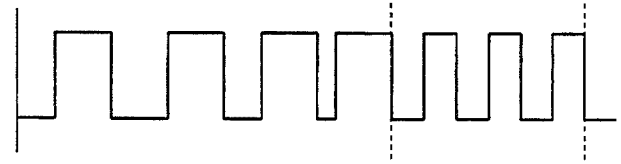
Figure 7C:
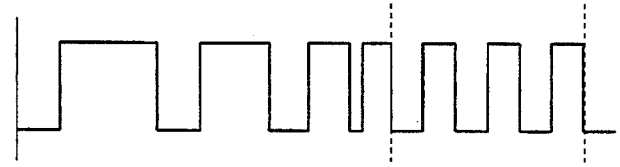

Referring to FIGS. 7A–7C, FIG. 7A indicates a PWM operating signal stream which corresponds to that shown in FIG. 4E. Again, according to this scheme, from times $T_{o^-}$ to $T_x$, the duty cycle of the operating signals are initially at a first value and then become progressively shorter. From times $T_x$ to $T_c$, the operating signals have a constant duty cycle which is shorter than the duty cycle of any of the operating signals supplied the switch means from times $T_o$ to $T_x$. In FIG. 7B, an alternate way of achieving the same result; that is, supplying a significantly higher voltage to the phase during the first portion of a phase active interval, includes supplying PWM signals having a constant duty cycle but a variable frequency. The frequency starts a selected frequency which becomes progressively higher during the interval $T_o$ to $T_x$. From times $T_x$ to $T_c$, the operating signals have a constant frequency which is higher than the frequency of any of the operating signals supplied the switch means from times $T_o$ to $T_x$. Finally, in FIG. 7C, a third method of supplying a significantly higher voltage to the phase during the first portion of a phase active interval, includes supplying PWM signals having both a variable duty cycle and a variable frequency. Regardless of how the frequency and duty cycle of the signals vary the interval $T_{o^-}$ to $T_x$, from times $T_x$ to $T_c$, they operating signals have both a constant frequency and a constant duty cycle.

What has been described is a control scheme and method for manipulating the current profile in each phase of a single or polyphase SRM. Circuitry implementing the control scheme controls the current profile during the active portion of each phase so as to lessen motor noise. The circuit and method can use either hard chopping or soft chopping current control techniques to control the current profile. In operation, the current level is first driven to a peak amplitude exceeding that to which the current is normally driven. The current is then allowed to fall from its peak to the same current level, when the phase becomes inactive, as the current would normally have. The result is to change the slope of the current profile when the phase becomes inactive to be much less abrupt than what it would otherwise be. The control scheme and method are readily incorporated into existing SRM control circuitry and can include a microprocessor. According to the method, the duty cycle of a PWM signal is used to control current flow in a phase winding when the phase is active thereby to rapidly drive the current to its peak amplitude at the beginning of the phase's active period. Alternately, the frequency of the PWM signals is varied to achieve the same result. It is also possible to vary both duty cycle and PWM frequency to accomplish the same result. It is an advantage of the control scheme and method to modify the normal forces within the motor so there is a less abrupt change in the normalized ovalizing forces acting on the motor when the motor phase changes from active to inactive thereby to reduce ringing in the motor.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. Apparatus for controlling the current profile of a current supplied to a winding of a switched reluctance motor (SRM) comprising:

switch means for directing current flow into the winding;

sensing means sensing operating conditions of the SRM;

signal generating means providing operating signals to the switch means to control current flow to the winding, the current amplitude in the winding being a function of the average voltage of the operating signals, and, control means responsive to the sensing means for controlling the current level in the winding for the current level to initially rapidly increase from zero to a peak value when current is first supplied to the winding and then decrease from the peak value to a second and lesser value, the current decaying from this second value to zero when current flow to the winding ceases, the average voltage of the operating signals being provided to the switch means during the initial current flow to the winding being significantly higher than the average voltage of the operating signals thereafter supplied to the switch means, whereby a transition in the resultant current profile which occurs when current flow ceases is not an abrupt transition, but a transition which reduces the amount of ringing in the motor and thereby motor noise, the control means controlling operation of the signal generating means to vary the pulse width, duty cycle, and frequency of an operating signal supplied to the switch means to control the average voltage of the operating signals and effect the current profile.

2. The apparatus of claim 1 wherein the SRM is a polyphase SRM having a winding for each motor phase, the control means controlling the current profile for current supplied to each phase winding when the phase is active by controlling the average voltage of the operating signals supplied to a switch means directing current flow to the phase winding.

3. The apparatus of claim 1 wherein the switch means comprises first and second switches between which the winding is connected, both switches being activated to allow current flow to the winding, and the signal generating means modulating one of the switches with operating signals to control operation of the switch.

4. The apparatus of claim 3 wherein the signal generating means modulates both switches with operating signals for both switches to be controlled by the signal characteristics of the operating signals.

5. The apparatus of claim 4 wherein the signal generating means includes a pulse width modulation (PWM) signal generator the pulse width, duty cycle, and frequency of the PWM signals produced by the signal generator being functions of the motor's operating characteristics and the PWM signals having an average voltage by which the current profile is produced when current is supplied to the winding.

6. The apparatus of claim 5 wherein the control means includes a microprocessor receiving inputs concerning the SRM's operation and controlling the signal characteristics of operating signals produced by the signal generating means as a function of these inputs and the current profile produced when a phase is active.

7. The apparatus of claim 6 wherein the control means is responsive to inputs from the sensing means to vary the pulse width, duty cycle, and frequency of the PWM operating signals produced by the signal generating means to effect the desired current profile by varying the signal characteristics during the interval current is supplied to the winding to produce operating signals with the appropriate average voltage.

8. The apparatus of claim 7 wherein the microprocessor is responsive to various inputs representing motor operating conditions to the vary the pulse width, the duty cycle, and frequency the PWM operating signals produced by the signal generating when the phase becomes active to means during the interval current is supplied to the winding to effect the desired current profile.

9. The apparatus of claim 3 wherein the control means controls the signal generating means to produce an operating signal which provides a soft chopping of the current during the interval current is supplied to the winding.

10. The apparatus of claim 4 wherein the control means controls the signal generating means to produce an operating signal which provides a hard chopping of the current during the interval current is supplied to the winding.

11. The apparatus of claim 2 wherein the control means is responsive to the sensing means to control the signal generating means for the signal generating means to produce an operating signal having signal characteristics which result in the desired average voltage by which current is supplied to each phase winding in accordance with a predetermined profile for current flow in the winding to rapidly increase from zero to a peak value when the phase becomes active and then allowed to decrease from the peak value to a second and lesser value by the time the phase becomes inactive, current decaying from this second value to zero when the phase becomes inactive.

12. Apparatus for controlling the profile of a current supplied to the winding of a polyphase switched reluctance motor during the active portion of a phase comprising:

switch means for directing current flow into the winding including first and second switches between which the winding is connected;

sensing means for sensing various operating parameters of the motor; and, microprocessor means responsive to the sensing means for providing pulse width modulated (PWM) operating signals to the switch means to control current flow to the winding, said operating signals being supplied to at least one of the switches to modulate the switch for operation to be controlled as a function of the signal characteristics of the operating signals, current in the winding having an amplitude which is a function of the average voltage of the operating signals, the microprocessor means producing operating signals the average voltage of which is initially significantly higher than that of operating signals subsequently supplied to at least one of the switches for current flow to the winding to initially rapidly increase from zero to a peak value and then decrease from the peak value to a second and lesser value, the current decaying from this second value to zero when current supply to the winding ceases whereby the transition in the current profile which occurs when current flow ceases is not an abrupt transition, this non-abrupt transition reducing ringing in the motor and motor noise.

13. The apparatus of claim 12 wherein the microprocessor means is responsive to inputs from the sensing means to control the frequency and duty cycle of the PWM operating signals for the pulse width, frequency, and duty cycle to initially be one value which changes as the current increases from zero to its peak value.

14. The apparatus of claim 13 wherein the microprocessor means is further responsive to the sensing means to provide a constant frequency and duty cycle of PWM operating signals from the time when the current reaches the peak value of the current profile until flow of current to the winding ceases.

15. A method for controlling current flow to a winding of a switched reluctance motor comprising:

switching the winding into a circuit by which current flow is directed through the winding;

generating operating signals used to control current flow to the winding for the flow to be in accordance with a predetermined profile;

controlling the average voltage of the operating signals by control line the pulse width, duty cycle and frequency of the operating signals for the current in the winding to rapidly increase from zero to a peak value, the average voltage of the operating signals being initially controlled at a first level to increase the current to its peak value and then be controlled at a second and lesser level for the winding current to then decrease from the peak value to a second and lesser value, the current decaying from this second value to zero when current flow to the winding ceases whereby the transition in current flow which current flow ceases is not an abrupt transition, this non-abrupt transition reducing motor ringing and thereby motor noise.

16. The method of claim 15 wherein generating operating signals includes generating PWM operating signals.

17. The method of claim 16 wherein generating PWM operating signals includes generating variable duty cycle PWM signals with the duty cycle being initially one length which becomes progressively shorter as the current increases from zero to its peak value, and then generating constant duty cycle PWM signals until current flow through the winding ceases, the average voltage of the operating signals being controlled as a function of the duty cycle to be an initially higher average voltage as the current increases, to its peak value and then to a constant lower average voltage after the peak current value is reached.

18. The method of claim 16 wherein generating PWM operating signals includes generating variable frequency PWM signals having a frequency which becomes progressively higher as the current increases from zero to its peak value and then generating constant frequency PWM operating signals from the time when the current reaches its peak value until current flow ceases, the average voltage of the operating signals being controlled as a function of the frequency to be an initially higher average voltage as the current increases to its peak value and then to a constant lower average voltage after the peak current value is reached.

19. The method of claim 16 wherein generating PWM operating signals includes generating operating signals having a variable frequency and duty cycle both of which are varied as the current increases from zero to its peak value and then remain constant until current flow ceases, the average voltage of the operating signals being controlled as a function of the frequency and duty cycle to be an initially higher average voltage as the current increases to its peak value and then to a constant lower average voltage after the peak current value is reached.

* * * * *

UNITED STATES PATENT AND TRADEMARK OFFICE
CERTIFICATE OF CORRECTION

PATENT NO.  : 5,461,295
DATED       : October 24, 1995
INVENTOR(S) : Gary E. Horst It is certified that error appears in the above-indentified patent and that said Letters Patent is hereby corrected as shown below:

Column 9,
Claim 15, line 23, "control line" should be -- controlling --.

Signed and Sealed this

Nineteenth Day of November, 1996

Attest:

BRUCE LEHMAN

*Attesting Officer*        *Commissioner of Patents and Trademarks*